United States Patent
Okada et al.

(10) Patent No.: US 6,542,211 B1
(45) Date of Patent: Apr. 1, 2003

(54) LIQUID CRYSTAL DEVICE AND DRIVING METHOD THEREFOR

(75) Inventors: Shinjiro Okada, Isehara (JP); Hirohide Munakata, Yokohama (JP); Akira Tsuboyama, Sagamihara (JP); Yasuyuki Watanabe, Atsugi (JP); Yasufumi Asao, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/333,038

(22) Filed: Jun. 15, 1999

(30) Foreign Application Priority Data

| Jun. 18, 1998 | (JP) | 10-171232 |
| Dec. 4, 1998 | (JP) | 10-345440 |

(51) Int. Cl.⁷ .......................................... G02F 1/1337
(52) U.S. Cl. ..................................................... 349/130
(58) Field of Search .................................. 349/129, 130

(56) References Cited

U.S. PATENT DOCUMENTS

| 4,674,839 A | 6/1987 | Tsuboyama et al. | 350/334 |
| 4,712,877 A | 12/1987 | Okada et al. | 350/350 S |
| 4,738,515 A | 4/1988 | Okada et al. | 350/350 S |
| 4,778,260 A | 10/1988 | Okada et al. | 350/350 S |
| 4,800,382 A | 1/1989 | Okada et al. | 340/784 |
| 4,844,590 A | 7/1989 | Okada et al. | 350/350 S |
| 4,902,107 A | 2/1990 | Tsuboyama et al. | 350/350 S |
| 4,917,470 A | 4/1990 | Okada et al. | 350/333 |
| 4,923,285 A | 5/1990 | Ogino et al. | 350/331 T |
| 4,958,915 A | 9/1990 | Okada et al. | 350/345 |

(List continued on next page.)

FOREIGN PATENT DOCUMENTS

| GB | 2 121 226 | 12/1983 |
| GB | 2 309 539 | 7/1997 |

OTHER PUBLICATIONS

Patent Abstracts of Japan, vol. 014, No. 581 (P–1147), Dec. 26, 1990 & JP 02 251821 A (Canon Inc), Oct. 9, 1990 * abstract *.

Miyashita T et al: "Optically Compensated Bend Mode (OCB Mode) with Wide Viewing Angle and Fast Response", Ieice Transactions on Electronics, JP, Institute of Electronics Information and Comm. Eng. Tokyo, vol. E79–C, NR. 8, pp. 1076–1082 XP00063426 ISSN: 0916–8524.

Xu M et al: "Very high pretilt alignment and its application in Pi–cell LCDs" 1998 SID International Symposium. Digest of Technical Papers. vol. 29, Proceedings of SID'98. International Symposium Anaheim, CA, USA, May 17–22, 1998, pp. 139–142, XP002157159 1998, Santa Anaheim, CA, USA, Soc. Inf. Display, USA.

Sueoka K et al: "Initialization of Optically Compensated Bend–Mode LCDs" AM–LCD '96, Nov. 11, 1996), pp. 133–136, XP0002151760.

Miyashita, Tetsuya, et al., Wide–Viewing–Angle Display Mode Using Bend–Alignment Liquid Crystal Cell, Jpn. J. Appl. Phys., vol. 34 (1995), pp. L 177–L 179, Part 2 , No. 2A, Feb, 1, 1995.

Kuo, C–L., et al., Improvement of Gray–Scale Performance of Optically Compensated Birefringence (OCB) Display Mode for AMLCDs, SID 94 Digest, pp. 927–930, 1994.

*Primary Examiner*—Toan Ton
(74) *Attorney, Agent, or Firm*—Fitzpatrick, Cella, Harper & Scinto

(57) ABSTRACT

At least one of a pair of substrates constituting a liquid crystal device is provided with a composite alignment film including a homeotropic alignment film region and a homogeneous alignment film region, whereby the liquid crystal in contact with the homogeneous alignment film region is surrounded by the region of liquid crystal in a hybrid or homeotropic alignment state and is stably held in a twit alignment state under no electric field which can be continuously transformed into a bend alignment state. As a result, it is possible to provide a liquid crystal device capable of display by utilizing bend alignment with reduced bending voltage and voltage for holding the bend alignment.

12 Claims, 13 Drawing Sheets

U.S. PATENT DOCUMENTS

| | | |
|---|---|---|
| 4,973,135 A | 11/1990 | Okada et al. ................ 350/334 |
| 5,026,144 A | 6/1991 | Taniguchi et al. ........ 350/350 S |
| 5,033,822 A | 7/1991 | Ooki et al. .............. 350/331 T |
| 5,041,821 A | 8/1991 | Onitsuka et al. ............ 340/784 |
| 5,058,994 A | 10/1991 | Mihara et al. ................. 359/56 |
| 5,124,820 A | 6/1992 | Tsuboyama et al. .......... 359/56 |
| 5,233,447 A | 8/1993 | Kuribayashi et al. ......... 359/56 |
| 5,276,542 A | 1/1994 | Iwayama et al. ............. 359/86 |
| 5,321,419 A | 6/1994 | Katakura et al. ............. 345/97 |
| 5,353,137 A | 10/1994 | Tsuboyama et al. .......... 359/56 |
| 5,379,138 A | 1/1995 | Okada ........................ 359/56 |
| 5,446,570 A | 8/1995 | Kaneko et al. ............... 359/87 |
| 5,469,281 A | 11/1995 | Katakura et al. ............. 359/56 |
| 5,471,229 A | 11/1995 | Okada et al. ................. 345/89 |
| 5,506,601 A | 4/1996 | Mihara et al. .............. 345/103 |
| 5,508,711 A | 4/1996 | Okada ........................ 345/97 |
| 5,519,411 A | 5/1996 | Okada et al. ................. 345/89 |
| 5,521,727 A | 5/1996 | Inaba et al. .................... 359/56 |
| 5,532,713 A | 7/1996 | Okada et al. ................. 345/97 |
| 5,581,381 A | 12/1996 | Shinjo et al. ................. 349/85 |
| 5,583,534 A | 12/1996 | Katakura et al. ............. 345/97 |
| 5,592,190 A | 1/1997 | Okada et al. ................. 345/89 |
| 5,592,191 A | 1/1997 | Tsuboyama et al. .......... 345/97 |
| 5,598,229 A | 1/1997 | Okada et al. ................ 348/792 |
| 5,602,562 A | 2/1997 | Onitsuka et al. ............ 345/101 |
| 5,606,343 A | 2/1997 | Tsuboyama et al. .......... 345/97 |
| 5,608,420 A | 3/1997 | Okada ........................ 345/89 |
| 5,627,559 A | 5/1997 | Tsuboyama et al. .......... 345/97 |
| 5,646,755 A | 7/1997 | Okada et al. ................. 345/97 |
| 5,650,797 A | 7/1997 | Okada ........................ 345/97 |
| 5,657,038 A | 8/1997 | Okada et al. ................. 345/94 |
| 5,673,062 A | 9/1997 | Katakura et al. ............. 359/95 |
| 5,689,320 A | 11/1997 | Okada et al. ............... 349/135 |
| 5,691,740 A | 11/1997 | Onitsuka et al. .............. 345/96 |
| 5,717,421 A | 2/1998 | Katakura et al. ........... 345/101 |
| 5,734,367 A | 3/1998 | Tsuboyama et al. ........ 345/101 |
| 5,754,154 A | 5/1998 | Katakura et al. ............. 345/97 |
| 5,757,455 A * | 5/1998 | Sugiyama et al. ........... 349/129 |
| 5,777,710 A | 7/1998 | Okada et al. ............... 349/138 |
| 5,796,381 A | 8/1998 | Iwasaki et al. .............. 345/101 |
| 5,808,594 A | 9/1998 | Tsuboyama et al. .......... 345/89 |
| 5,815,132 A | 9/1998 | Okada et al. ................. 345/95 |
| 5,815,133 A | 9/1998 | Tsuboyama et al. .......... 345/95 |
| 5,825,448 A * | 10/1998 | Bos et al. .................... 349/130 |
| 5,844,536 A | 12/1998 | Okada et al. ................. 345/94 |
| 5,886,678 A | 3/1999 | Katakura et al. ............. 345/94 |
| 5,894,297 A | 4/1999 | Mizutome et al. ............ 345/99 |
| 5,956,010 A | 9/1999 | Asao et al. ................... 345/94 |
| 5,963,190 A | 10/1999 | Tsuboyama et al. ........ 345/103 |
| 5,973,657 A | 10/1999 | Okada et al. ................. 345/89 |
| 6,097,463 A * | 1/2000 | Chen .......................... 349/130 |
| 6,040,885 A * | 3/2000 | Koike et al. ................. 349/129 |
| 6,061,116 A * | 5/2000 | Nishida et al. .............. 349/130 |
| 6,288,762 B1 * | 9/2001 | Sasaki et al. ................ 349/129 |

* cited by examiner

BEFORE E. F. TREATMENT  AFTER E. F. TREATMENT

HYBRID B

HYBRID A

SPLAY

TWIST R

TWIST L

BEND

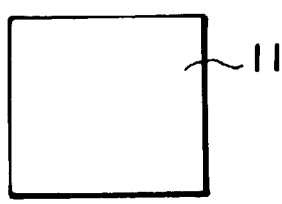
FIG. 9A1
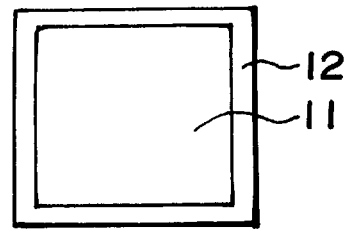
FIG. 9B1
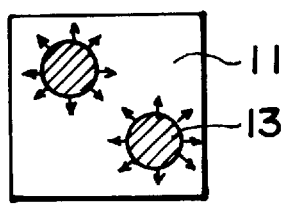
FIG. 9A2
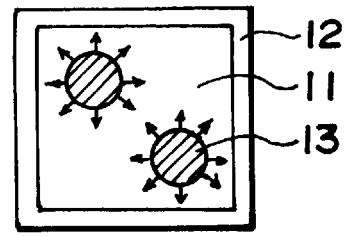
FIG. 9B2
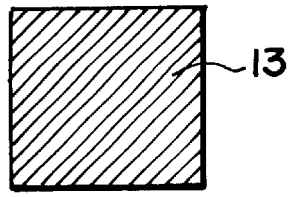
FIG. 9A3
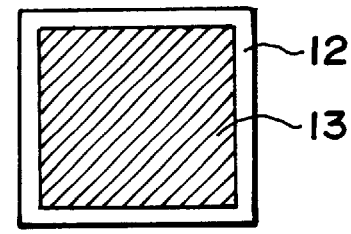
FIG. 9B3
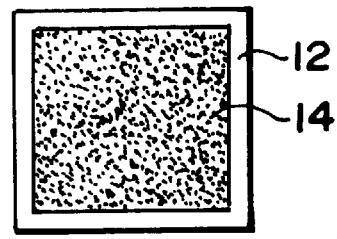
FIG. 9B4

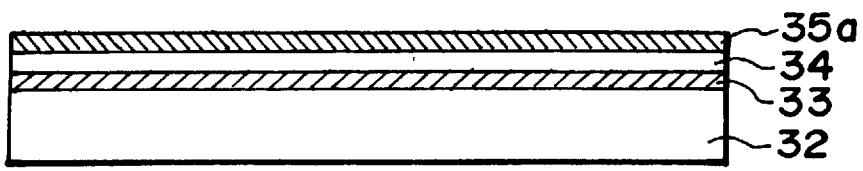
F I G. 14A
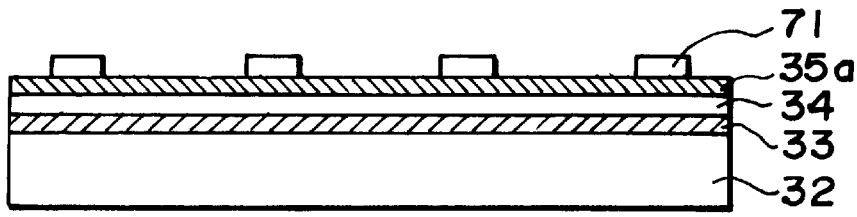
F I G. 14B
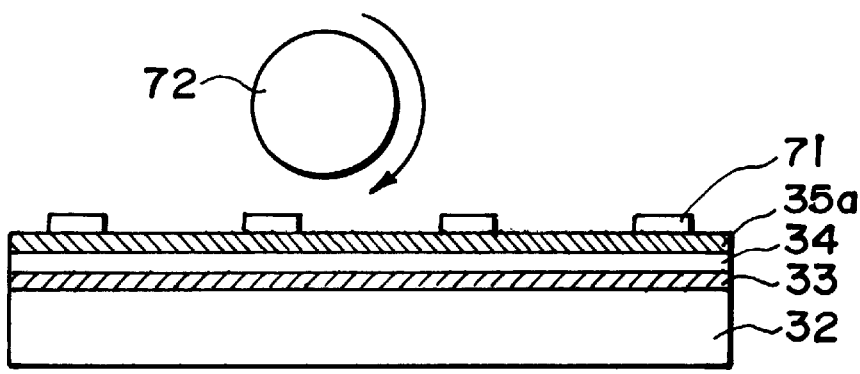
F I G. 14C
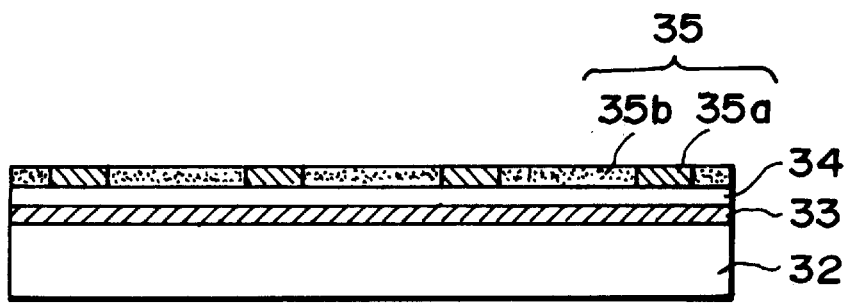
F I G. 14D

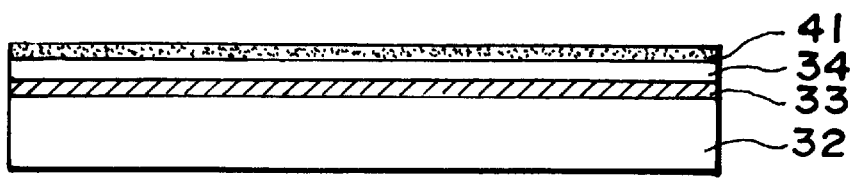
F I G. 15A
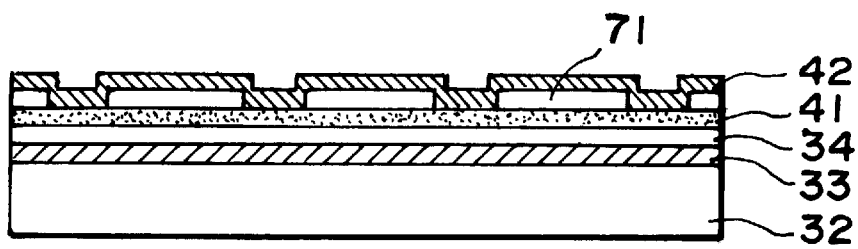
F I G. 15B
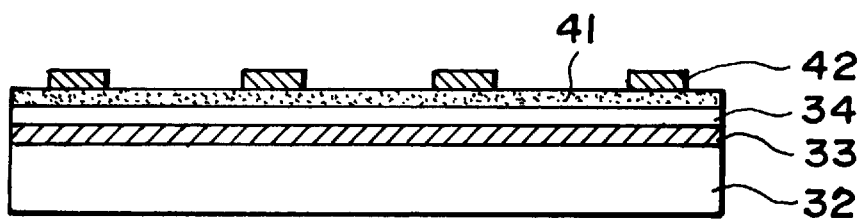
F I G. 15C
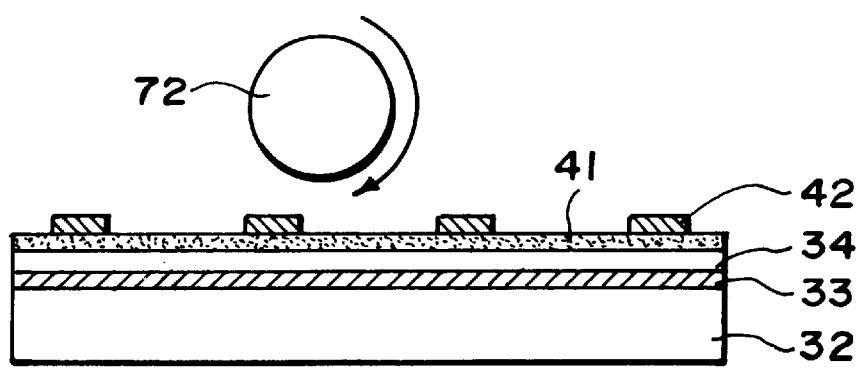
F I G. 15D

LIQUID CRYSTAL DEVICE AND DRIVING METHOD THEREFOR

FIELD OF THE INVENTION AND RELATED ART

The present invention relates to a liquid crystal device used as a display for personal computers, etc., and a driving method therefor.

In recent years, liquid crystal devices have been frequently used, and most of them are TN (twisted nematic)-mode liquid crystal devices using a liquid crystal cell comprising a pair of substrates provided with alignment films having rubbing directions which are deviated from each other by 90 deg. and a nematic liquid crystal disposed between the substrates. There is also known a liquid crystal device wherein a nematic liquid crystal is placed in a splay alignment state between a pair of substrates provided with alignment films having identical rubbing directions. Further, a type of cell (π-cell) wherein the above-mentioned liquid crystal placed in a splay alignment is re-aligned into a bend alignment by applying a voltage thereto so as to provide an improved response speed, was disclosed by P. J. Bos, et al in 1983. Further, a system (OCB cell) wherein such a bend alignment cell is combined with phase compensation to provide an improved viewing angle characteristic was disclosed by Uchida, et al., in 1992.

In such a bend alignment-type nematic liquid crystal device aims at suppressing a back-flow phenomenon in response of liquid crystal to provide improved and high-speed responsiveness, but has involved several problems for its commercialization.

One of such problems is that an electric field treatment is required for transforming the splay alignment into the bend alignment. The splay-bend alignment transformation is not continuous, and a disclination line is present between the two alignment states, so that a process including nucleation and its growth is necessary. In such a process, it is difficult to cause nucleation in all the regions and the control of the nucleation threshold is difficult, so that a high voltage application is required for the electric field treatment. Further, the velocity of growth of the bend alignment regions formed by the nucleation is larger at a higher voltage application, and a time of several seconds to several minutes is required at a low voltage. Another problem is that, in an actual matrix-structured cell, the bend region does not readily grow between pixel electrodes. Several studies have been made regarding manners of voltage application in active matrix-type cells using TFTs (thin film transistors) (e.g., IBM, IDW 1996, p. 133, Initialization of Optically Compensated Bend-mode LCDs", and Japanese Laid-Open Patent Application (JP-A) 9-185032). A further problem is that the bend alignment is restored to splay alignment if the bending voltage is removed, so that a bending treatment is required anew for re-use.

SUMMARY OF THE INVENTION

In view of the above-mentioned problems, an object of the present invention is to provide a liquid crystal device utilizing a bend alignment, which is improved in (1) an electric field treatment for transforming splay alignment into bend alignment, and (2) a re-bending treatment before use.

Another object of the present invention is to provide a liquid crystal device requiring a lower re-bending voltage and a lower holding voltage for holding or retaining the bend alignment state.

A further object of the present invention is to provide a driving method for such a liquid crystal device.

According to the present invention, there is provided a liquid crystal device, comprising: a pair of substrates each having thereon an electrode and an alignment film, and a layer of nematic liquid crystal disposed between the substrates, wherein at least one alignment film includes a homeotropic alignment film region capable of aligning longer axes of liquid crystal molecules in contact therewith to form an angle of 80–90 deg. with respect to the associated substrate surface, and another alignment film region capable of placing the liquid crystal in contact therewith in an alignment state capable of conversion into a bend alignment on application of a bending voltage.

The present invention also provides a driving method for the above liquid crystal device, comprising switching between a twist alignment state and a bend alignment state of the liquid crystal to effect a display based on a difference in optical characteristic between the twist and bend alignment states.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 9A1–9A3 illustrate an alignment change at a pixel in a conventional device, and FIGS. 9B1 to 9B4 illustrate an alignment change at a pixel in a device according to the invention.

FIGS. 14A–14D are schematic sectional views illustrating a process for forming a composite alignment film used in the invention on a substrate.

FIGS. 15A–15D are schematic sectional views for illustrating another process for producing another composite alignment film used in the invention on a substrate.

DESCRIPTION OF THE PREFERRED EMBODIMENTS

In a liquid crystal device comprising a pair of substrates of which surfaces have been subjected to homogeneous alignment treatments in directions parallel to each other and a layer of liquid crystal disposed between the substrates in contact with the treated surfaces, the liquid crystal assumes a splay alignment as an initial alignment state after the liquid crystal injection in case where the pretilt angle at the treated surfaces is in the range of 5–10 deg. However, when the layer of an Np-type nematic liquid crystal, i.e., a nematic liquid crystal having a positive spontaneous polarization, placed in this alignment state is supplied with a voltage, the liquid crystal molecules at least in a middle region in the thickness direction are realigned in the electric field direction to assume a bend or homeotropic alignment state. If the electric field is removed, the liquid crystal in the state is realined into not the original splay alignment but into a twist alignment state wherein liquid crystal molecular longer axes are twisted over 180 deg. This alignment state has a high distortion energy, is unstable and is returned into the splay alignment state in an ordinary case, i.e., except for a case where the surrounding region is in hybrid alignment. According to out study, however, it has been found that such a 180 deg. twist alignment state can be stabilized due to the influence of a surrounding region if the surrounding region is in hybrid alignment or homeotropic alignment.

A splay alignment state cannot be continuously transferred into a bend alignment state, so that a disclination line is present between regions of these alignment states. Further in the case where the pair of substrates have been subjected to rubbing in directions which are parallel and identical to each other, the splay alignment is stable under no voltage application, and the bend or twist alignment is stable under voltage application.

Figure 7:
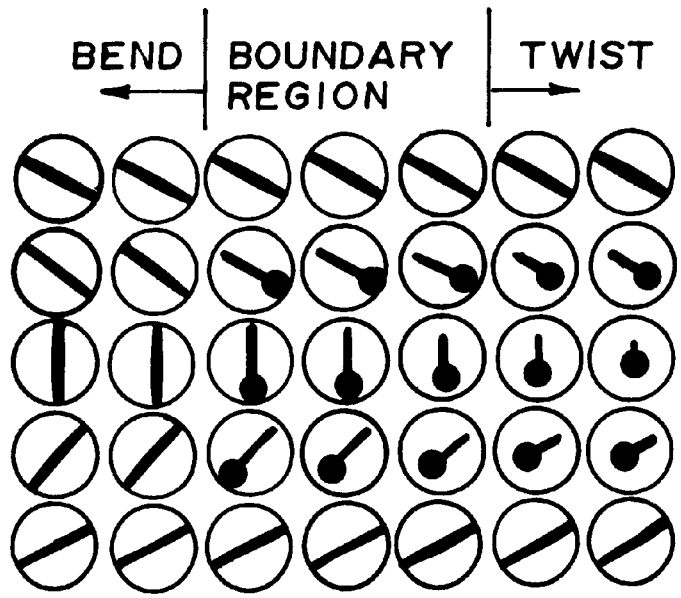
FIG. 7 illustrates a continuous director change between twist alignment region and bend alignment region via a boundary region.

As shown in FIG. 7, a twist alignment state can be continuously transformed into a bend alignment state, so that it is possible to obviate the formation of a disclination line between these two alignment states. Accordingly, the transformation from a twist alignment state into a bend alignment state need not require a process including nucleation and growth of bend domain.

This provides a great advantage in commercialization of a liquid crystal device utilizing bend alignment. More specifically, if the twist alignment can be stabilized under no electric field, the bending treatment need not be effected each time before use.

It is generally possible to stabilize the twist alignment under no electric field by incorporating in the liquid crystal a chiral dopant in an appropriate amount corresponding to the cell thickness. However, when we drove a liquid crystal device of the above-mentioned π-cell type or OCB-mode (optically compensated bend-mode) by using such a liquid crystal material having a spontaneous twist structure, there were found difficulties such that (1) some twist component remained after transformation into the bend alignment state by application of a prescribed voltage, and the phase compensation was imperfect in the OCB-mode to result in inferior contrast and viewing angle characteristic, and (2) when optical response accompanying the switching between bend alignment states by application of a prescribed voltage was observed, some bounding or overshooting of the response was observed especially in switching to the lower voltage side, thus resulting in a substantially lower response speed than in the case of adding no chiral dopant.

Accordingly, as briefly mentioned above, in order to stabilize the twist alignment of a non-chiral liquid crystal under no electric field, we examined the possibility of providing a liquid crystal device with two regions of different aligning treatments and controlling the alignment state of the liquid crystal layer in the other region.

More specifically, as a result of the examination, it has been found possible to stabilize the twist alignment of a liquid crystal in a region under no electric field by disposing a homeotropic alignment film region on at least one substrate adjacent to the region of twist alignment. The region of twist alignment of a liquid crystal (i.e., the region at which the liquid crystal is transformed into bend alignment by application of a bending voltage) may be formed between regions of homogeneous alignment films on the pair of substrates which have been provided with mutually parallel alignment directions. The homeotropic alignment region may be formed as a homeotropic alignment region where the pair of substrates are both provided with a homeotropic alignment film region or a hybrid alignment region where one substrate is provided with a homeotropic alignment film and the other substrate is provided with a homogeneous alignment film region. Now, the function of stabilizing twist alignment by such an adjacent homeotropic alignment region (in a sense of including a hybrid alignment region) will be described based on experimental results.

Figure 8:
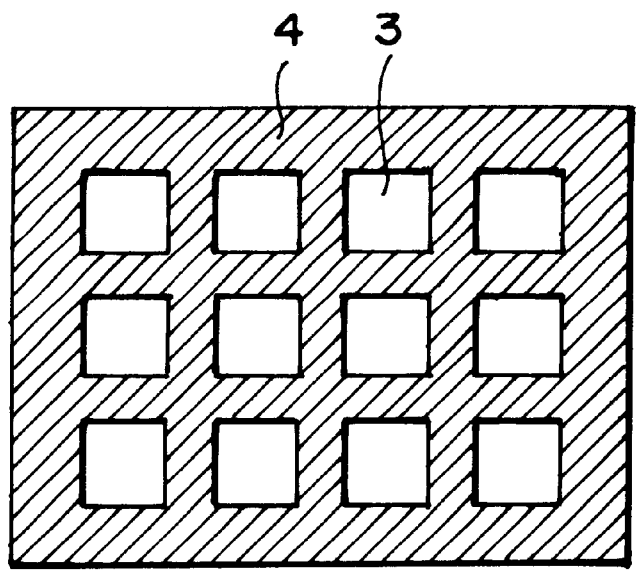
FIG. 8 is a plan view showing an example of alignment regions in a liquid crystal device according to the invention.

As shown in FIG. 8, a liquid crystal device including homogeneous alignment regions 3 corresponding to pixels and hybrid alignment regions 4 surrounding the regions 3 was prepared. The hybrid alignment regions 4 were also provided with electrodes for voltage application thereat. When the device was examined with respect to alignment, several characteristic alignment states were observed at the respective alignment regions, which will be described with reference to FIGS. 1AA to 1BC, which are schematic sectional views of a cell region including liquid crystal molecules having directors 2 disposed between substrates 1a and 1b, some of which have been rubbed in directions denoted by arrows parallel to the substrates.

Figure 1A:
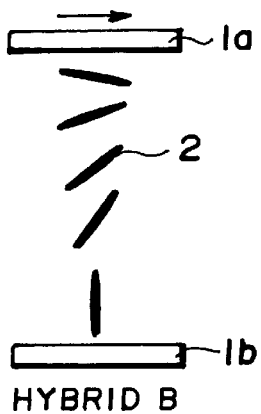
FIGS. 1AA, 1AB, 1BA, 1BB and 1BC are schematic sectional views for illustrating alignment changes between two hybrid alignment states and between splay alignment and two twist alignments.
Figure 1A:
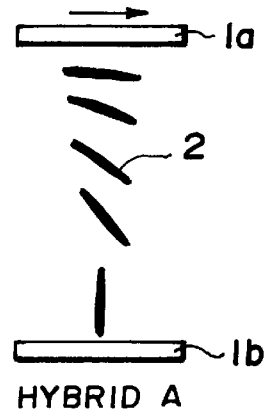

First, a hybrid alignment region is noted. In a hybrid alignment, liquid crystal molecules are present only in a plane perpendicular to the substrates including a rubbing direction (as an aligning treatment) and accordingly provide an extinction position when observed through cross nicol polarizers including one having a polarization axis in alignment with the rubbing axis. In this state, when an electric field is applied across the substrates in a direction of normal to the substrates (electric field treatment), an alignment transformation through disclination occurs. If the electric field is removed again, an alignment structure different from that before the electric field treatment is observed. Also this alignment structure provides an extinction position when observed through cross nicol polarizers including a polarization axis aligned with the rubbing axis. Now, the alignment state before the electric field treatment is referred to as hybrid B alignment, and the alignment state after the electric field treatment is referred to as hybrid A alignment. Both alignment states provide an extinction position in one polarization axis of cross nicol polarizers, and the hybrid A alignment experimentally exhibits a smaller retardation value, so that the hybrid B and hybrid A alignments may be attributable to the alignment structures as shown in FIGS. 1AA and 1AB, respectively.

Figure 1B:
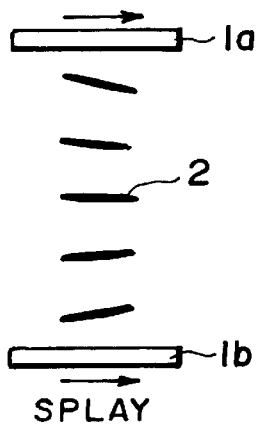
Figure 1B:
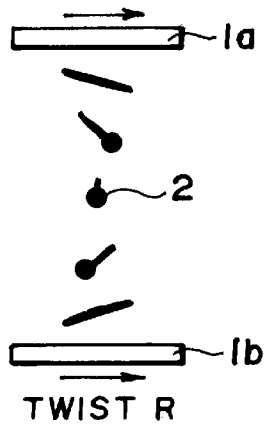
Figure 1B:
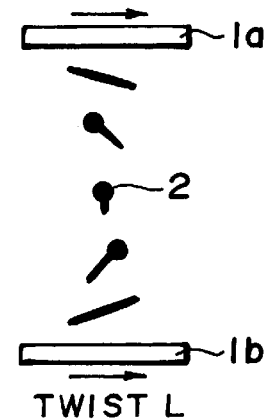
Figure 2:
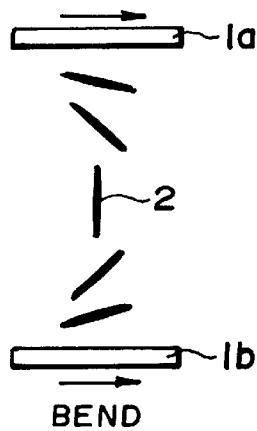
FIG. 2 is a schematic sectional view for illustrating bend alignment to be formed under voltage application.

On the other hand, the liquid crystal in the homogeneous alignment region assumes a splay alignment as shown in FIG. 1BA until the electric field treatment (bending treatment). As a result of the electric field treatment, the liquid crystal is once transformed into bend alignment as shown in FIG. 2 and, on removal of the electric field, transformed into dextro-rotatory twist alignment R as shown in FIG. 1BB or levo-rotatory twist alignment L as shown in FIG. 1BC. The twist alignment leaves director components not parallel to the rubbing axis, thus not providing an extinction position and accordingly can be easily differentiated from the splay alignment. It has been confirmed that the twist alignment is retained even under no electric field. Further, the twist alignment can be continuously and smoothly transformed into bend alignment as shown in FIG. 2 on application of a voltage on the order of 1–2 volts. Accordingly, this is very useful in a π-cell or an OCB-mode cell using the bend alignment for display.

As described above, by providing two different aligning treatment regions in a liquid crystal device, different alignment structures can be provided by an electric field treatment. More specifically, splay-hybrid B alignment combination is stably formed before an electric field treatment, and twist-hybrid A alignment combination is stabilized after the electric field treatment. The twist alignment may include a levo-rotatory one and a dextro-rotatory one, but after the electric field treatment, they are uniformized into either one state in many cases.

The mechanism for stabilizing the respective alignment states before and after the electric field treatment will now be described with reference to FIGS. 3–7.

An important factor regarding the stability of the respective alignment states is whether or not a disclination is present at a boundary region between two different alignment states. In the case where two different alignment state regions are continuously joined, there remains a relatively small elastic energy at the boundary region. On the other hand, in the case where two alignment states cannot be joined with a continuous change at the boundary region, a disclination occurs at the discontinuity, resulting in a locally very large elastic distortion energy.

Figure 3:
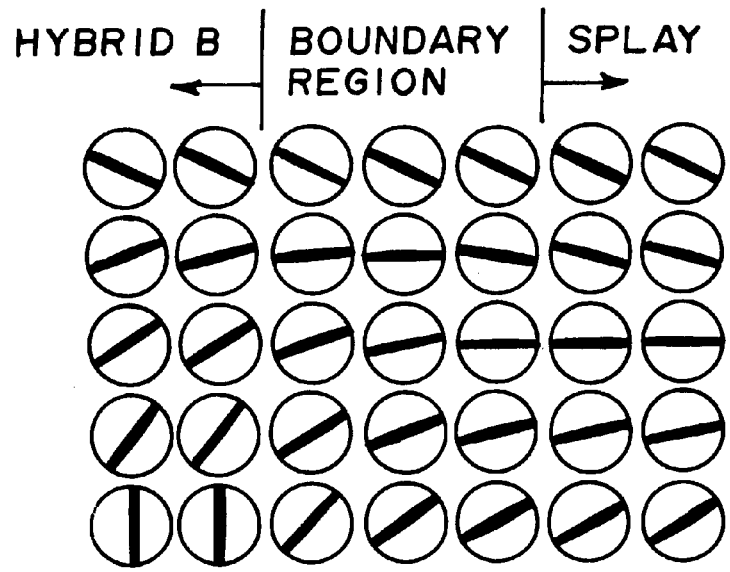
FIG. 3 illustrates a continuous director change between splay alignment region and hybrid B alignment region via a boundary region.
Figure 4:
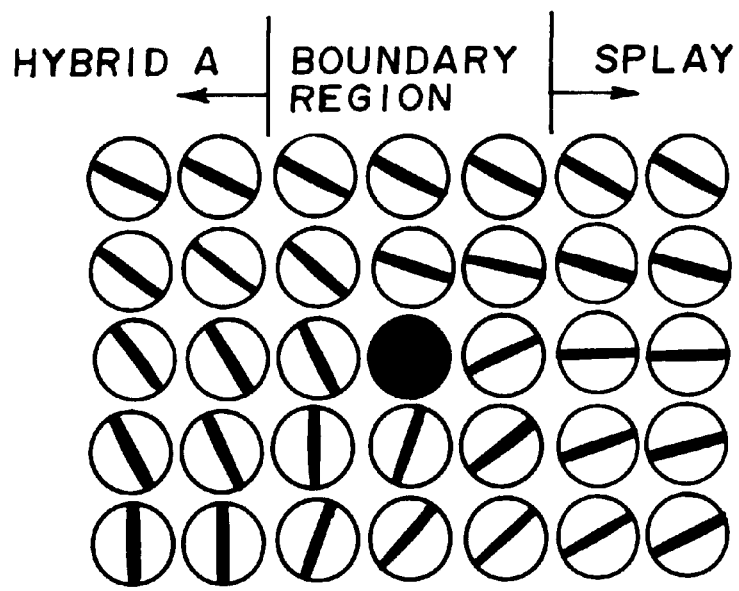
FIG. 4 illustrates a discontinuous director change between splay alignment region and hybrid A alignment region via a boundary region.

For example, FIGS. 3 and 4 are schematic sectional views each taken along a plane perpendicular to the substrates and including the rubbing direction for illustrating liquid crystal director arrangements. Splay alignment and hybrid B alignment can be joined with each other via continuous director changes at the boundary region as shown in FIG. 3, whereas splay alignment and hybrid A alignment cannot be joined via continuous changes at the boundary region but the presence of a disclination (discontinuity) as represented by a black spot shown in FIG. 4. The disclination shown in FIG. 4 is a species of "twist disclination" described in "Physics of Liquid Crystals" (a translation into Japanese of a book written) by S. Chandrasekkar, p. 145, published from Yoshioka Shoten K.K. Two directors disposed opposite to each other so as to sandwich the disclination are deviated from each other by an angle of 90 deg., and directors rotate by 180 deg. during one revolution around the disclination.

Figure 5:
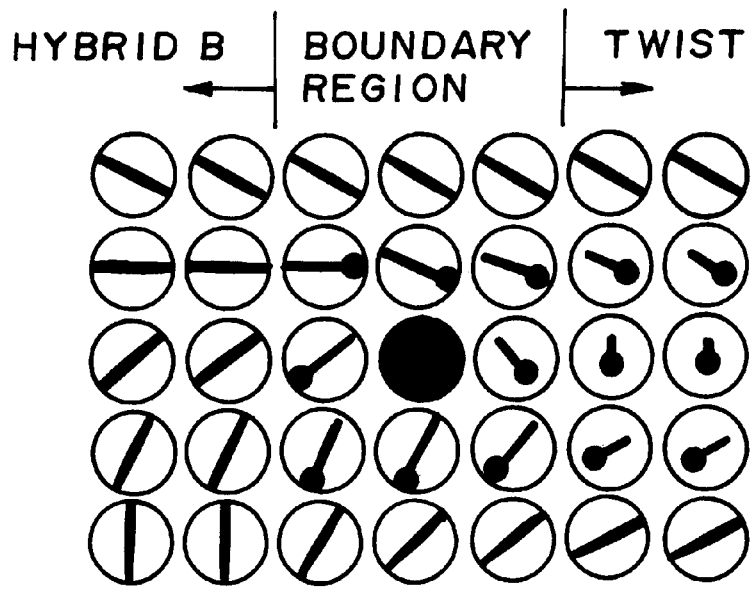
FIG. 5 illustrates a discontinuous director change between twist alignment region and hybrid B alignment region via a boundary region.
Figure 6:
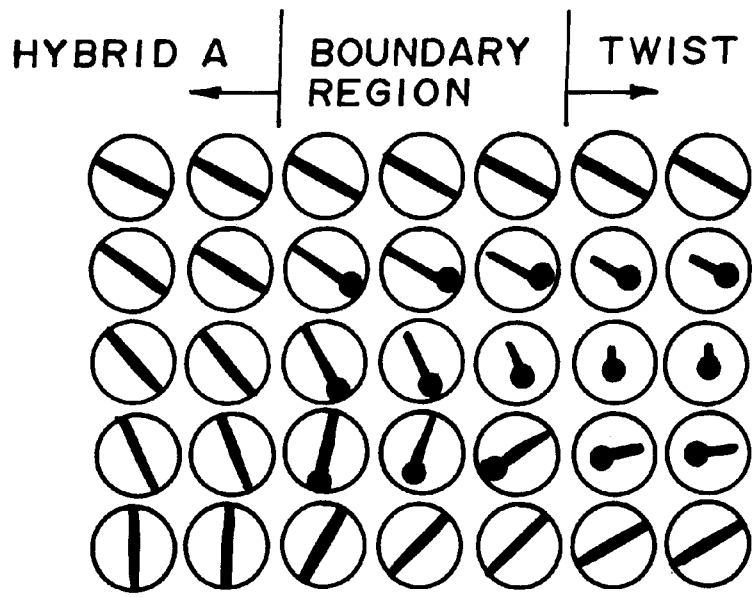
FIG. 6 illustrates a continuous director change between twist alignment region and hybrid A alignment region via a boundary region.

Similarly, as shown in FIGS. 5 and 6, a disclination is necessarily present between hybrid B alignment and splay alignment, but twist alignment and hybrid A are joined continuously with each other.

As mentioned before, the elastic distortion energy at the boundary region is larger in the case where a disclination is present than in the case of no disclination. On the other hand, as is understood from illustrations in FIGS. 1AA to 1BC, the elastic distortion energy in the alignment regions is smaller in hybrid A alignment with a smaller director rotation angle than in hybrid B alignment and is smaller in splay alignment with a director rotation angle of nearly 0 deg. than in twist alignment with a director rotation angle of nearly 180 deg. The reason why the hybrid B alignment or the twist alignment which per se is a higher energy state can be stably present under no electric field is that, in an alignment state combination including a disclination, a locally large energy is present thereat, thereby providing the entire system with a high energy. As a result, a combination of splay alignment and hybrid B alignment under no electric field before an electric field treatment and a combination of twist alignment and hybrid A alignment each capable of a continuous change or transition between the two alignment states become most stable state combinations.

It has been confirmed that the twist alignment after an electric field treatment is retained even if the hybrid alignment region is replaced by a purely homeotropic alignment region. This is presumably because a continuity is retained at a boundary region between the homeotropic alignment and the twist alignment.

Based on the above-mentioned experimental results and analysis, in the liquid crystal device according to the present invention, at least one substrate is provided with a homeotropic alignment film region, thereby controlling the alignment state of a liquid crystal in a region adjacent to the homeotropic alignment film region.

Even an alignment state in a region is in a high-energy state when considered by itself can be stabilized by placing an appropriate adjacent region to form an appropriate combination of two regional alignment states. By applying this technique, it becomes possible to form a desired alignment state by transformation according to an electric field treatment and holding the desired alignment state under no voltage application, thereby providing a bistable liquid crystal device.

As an example of bistable liquid crystal device, a bistable twisted nematic (BTN) liquid crystal device has been proposed by Tanaka et al., ASIA DISPLAY (1995), p. 259. This device uses a uniform state and a 2π-twist state as two semi-stable states for display. By applying the above technique to this type of device to form two regions of different aligning treatments, it becomes possible to stably retain a uniform state and a 2π-twist state in a display region under no electric field by forming an adjacent region of, e.g., hybrid alignment. In the BTN device, the two stable states are transformed into a stable π-twist state not used for display within several seconds to several tens of seconds under no voltage application, so that it cannot constitute a memory display device capable of display under no electrical signal application. However, the development of this type of device into a memory display device becomes possible by utilizing the above-mentioned technique of stabilization based on a combination of different alignment state regions.

The alignment state change in the liquid crystal device of the present invention will be described with reference to FIGS. 9B1 to 9B4 in comparison with that in a conventional device having no hybrid alignment region shown in FIGS. A1 to A3. In these figures, reference numeral 11 represents a splay alignment region; 12, a hybrid alignment region; 13, a bend alignment region; and 14, a twist alignment region. FIGS. 9B1 to 9B4 represent alignment states in an embodiment of the liquid crystal device including a hybrid alignment region 12 surrounding a prescribed display region.

In a liquid crystal device immediately after liquid crystal injection, a liquid crystal region to be converted into bend alignment by application of a bending voltage is all formed as a splay alignment region 11 as shown in FIGS. 9A1 and 9B1. At this point, the liquid crystal in the hybrid alignment region 12 is placed in hybrid B alignment (FIG. 9B1). Then, when these devices are supplied with a nucleating voltage, nuclei of bend alignment regions 13 occur in the splay alignment regions 11 as shown in FIGS. 9A2 and 9B2, and on further voltage increase up to a bending voltage, the splay alignment regions 11 are entirely transformed into bend alignment regions 13 as shown in FIGS. 9A3 and 9B3. The application of a holding voltage is necessary for retaining the bend alignment. At this time, the liquid crystal in the hybrid alignment region 12 is placed in hybrid A alignment which can be continuously changed into or joined with twist alignment (FIG. 9B3).

Now, if the voltage supply to the liquid crystal of bend alignment in the region 13 of the device shown in FIG. 9A3 is terminated, the liquid crystal is returned into splay alignment 11 as shown in FIG. 9A1. On the other hand, in the case of the liquid crystal device according to the present invention, the liquid crystal of bend alignment in the region 13 shown in FIG. 9B3 is stabilized in twist alignment state 14 (before returning to the splay alignment) as shown in FIG. 9B4, when holding voltage is removed because it is surrounded by the liquid crystal in hybrid A alignment in the hybrid region 12. Since the bend alignment and twist alignment are continuous in alignment structure as mentioned above, the transformation of twist alignment into bend alignment requires only a low voltage which is remarkably lower than the bending voltage for transforming splay alignment into bend alignment. As a result, it becomes possible to effect a display by utilizing a state change caused by switching between a twist alignment state and a substantially homeotropic alignment state (i.e., a state wherein liquid crystal molecules in bend alignment state are re-aligned substantially perpendicular to the substrates except for boundary regions with the substrates under voltage application) without applying such a bending voltage. The response speed in this switching is however somewhat slower than that in a switching between the bend alignment state and the substantially homeotropic alignment state. The responsiveness can be improved by using a liquid crystal substantially free from chirality. This is because, in the case of a liquid crystal containing a chiral component, twist alignment becomes predominant than bend alignment at a lower voltage side of drive voltages when once formed twist alignment is realined into bend alignment.

Further, in the above-described device, it is also possible to effect a display by utilizing a state change between a twist alignment state and a bend alignment state while utilizing the stable twist alignment state. In this case, twist alignment is developed at a low voltage and bend alignment is developed at a high voltage. Further, as these states can be continuously shifted from one to another, a stable intermediate state can be formed at an intermediate voltage. Such a state can be detected as an optical change by using cross nicol polarizers to provide a display device.

FIGS. 9B1–9B4 illustrate a device in which a prescribed region is surrounded by a hybrid alignment region. In such a case, the liquid crystal in bend alignment at a portion remote from the hybrid alignment region can be returned into splay alignment without remaining in twist alignment when the voltage supply thereto is removed. As a result, due to the function of liquid crystal molecules returned into splay alignment, a major portion of the twist alignment region 13 can be returned into splay alignment in some cases. However, as the hybrid alignment region retains the hybrid A alignment which can be continuously transformed into twist alignment, the splay alignment can be again transformed into twist alignment owing to the presence of the hybrid A alignment at a voltage substantially lower than the initially required bending voltage. Further, liquid crystal molecules in a region adjacent to the hybrid alignment region 12 are considered to locally remain in a twist alignment state and provide nuclei for bend alignment at the time of re-bending of liquid crystal molecules in splay alignment in such a major region. This is considered to be another factor for lowering the re-bending voltage.

The effect of lowering the re-bending voltage for re-bending of liquid crystal molecules returned into splay alignment can also be attained in the case of using a homeotropic alignment region instead of the hybrid alignment region. Also in this case, liquid crystal molecules in a region adjacent to the homeotropic alignment region is considered to locally remain in twist alignment and provide nuclei for bend alignment to lower the re-bending voltage.

In the present invention, particularly in order to hold the twist alignment state under no electric field after an electric field treatment, it is preferred to form a hybrid alignment region or a homeotropic alignment region so as to surround a region where bend alignment is to be established. This arrangement is, however, not essential, but such a region can be arranged in the form of dots or stripes as far as a desired effect can be attained. For example, it is possible to form each pixel as a region for bend alignment and each region between or outside pixels as a hybrid or homeotropic alignment region. Alternately, it is also possible to form a continuous region for bend alignment covering a plurality of pixels. Further, the hybrid alignment region and the homeotropic alignment region can be co-present.

In the liquid crystal device of the present invention, at least one substrate is provided with an alignment film locally having a homeotropic alignment film region capable of aligning liquid crystal molecules in contact therewith at an angle of 80–90 deg. thereto, i.e. with respect to an associated substrate having thereon the alignment film. Such an alignment film locally having a homeotropic alignment film region may preferably be provided as (1) an alignment film formed by locally rubbing an alignment film which is caused to exhibit a homogeneous alignment characteristic by rubbing but exhibits a homeotropic alignment characteristic in its as-formed or non-treated state, or (2) a laminate alignment film by locally forming a homeotropic alignment film on a homogeneous alignment film by using a photoresist. Such alignment films may be produced through processes as illustrated in FIGS. 14A–14D (for production of type (1) above) and FIGS. 15A–15D (for production of type (2) above), which are all schematic sectional views, wherein numeral 32 denotes a substrate; 33, a common electrode; 34, an insulating layer; 35$a$, a homeotropic alignment film region; 35$b$, a homogeneous alignment film region; 35, a (composite) alignment film; 41, a homogeneous alignment film; 42, a homeotropic alignment film; 71, a resist; and 72, a rubbing roller. The processes are respectively described below.

Referring to FIGS. 14A–14B, a substrate 32 is provided with a common electrode 33, an insulating layer 34 and other necessary members, if any, and then coated with an alignment film 35a which exhibits a homogeneous alignment characteristic after rubbing but exhibits a homeotropic alignment characteristic before rubbing. (FIG. 14A).

A resist 71 is formed at regions of the alignment film 35a where the homeotropic alignment characteristic is retained. (FIG. 14B). Then, the entire area is subjected to rubbing with a rubbing roller 72. (FIG. 14C). The resist 71 is then removed, e.g., by peeling, to leave a composite alignment film having homeotropic alignment film regions 35a which have been protected with the resist 71 during the rubbing and homogeneous alignment film regions 35 which have been formed through rubbing.

Now, a process for producing a type (2) composite alignment film is described with reference to FIGS. 15A–15D. First, a substrate 32 is provided with a common electrode 33, an insulating layer 34 and other necessary members, if any, and then coated with a homogeneous alignment film 41. (FIG. 15A).

Then, a resist 71 is formed at regions of the homogeneous alignment film 41 where the homogeneous alignment characteristic is to be retained, and then the entire surface is coated with a homeotropic alignment film 42. (FIG. 15B). The resist 71 is then removed by peeling together with a portion of the homeotropic alignment film 42 thereon to expose the homogeneous alignment film 41 thereat. (FIG. 15C). Then, the resultant laminate film is rubbed (FIG. 15D), as desired, to enhance the homogeneous alignment characteristic of the exposed regions of the homogeneous alignment film 41, thus providing a composite alignment film.

As a material constituting the film 35a from which a composite alignment film retaining a locally homeotropic alignment characteristic is produced through the process of FIGS. 14A–14D, it is possible to use a polyimide having a fluorine-containing substituent.

Examples materials constituting the homogeneous alignment film 41 to be used in the process of FIGS. 15A–15D for producing a composite alignment film may include: resins, such as polyvinyl alcohol, polyimide, polyamideimide, polyester, polycarbonate, polyvinyl acetal, polyvinyl chloride, polyvinyl acetate, polyamide, polystyrene, cellulosic resin, melamine resin, urea resin and acrylic resin; photosensitive polyimide, photosensitive polyamide, cyclic rubber-based photoresist, phenol novolak-based photoresist, and electron beam photoresist, such as polymethyl methacrylate, and epoxidized 1,4-polybutadiene.

Examples of materials constituting the homeotropic alignment film 42 in the process of FIGS. 15A–15D may include compounds represented by the following structural formulae:

$$CH_3Si(OCH_3)_3$$

$$CH_3Si(OC_2H_5)_3$$

$$C_6H_{13}Si(OCH_3)_3$$

$$C_8H_{17}Si(OCH_3)_3$$

$$C_{10}H_{21}Si(OCH_3)_3$$

$$C_{18}H_{37}Si(OCH_3)_3$$

$$C_{18}H_{37}Si(OC_2H_5)_3$$

-continued $$CF_3C_2H_4Si(OCH_3)_3$$

$$C_4H_9C_2H_4Si(OCH_3)_3$$

$$C_6F_{13}C_2H_4Si(OCH_3)_3$$

$$C_8F_{17}C_2H_4Si(OCH_3)_3$$

$$C_8F_{17}C_2H_4Si(OC_2H_5)_3$$

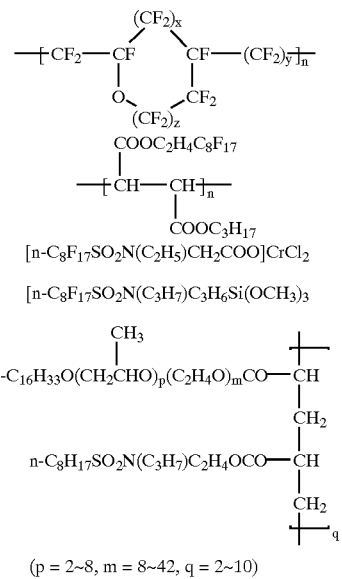

$(p = 2~8, m = 8~42, q = 2~10)$

Figure 10:
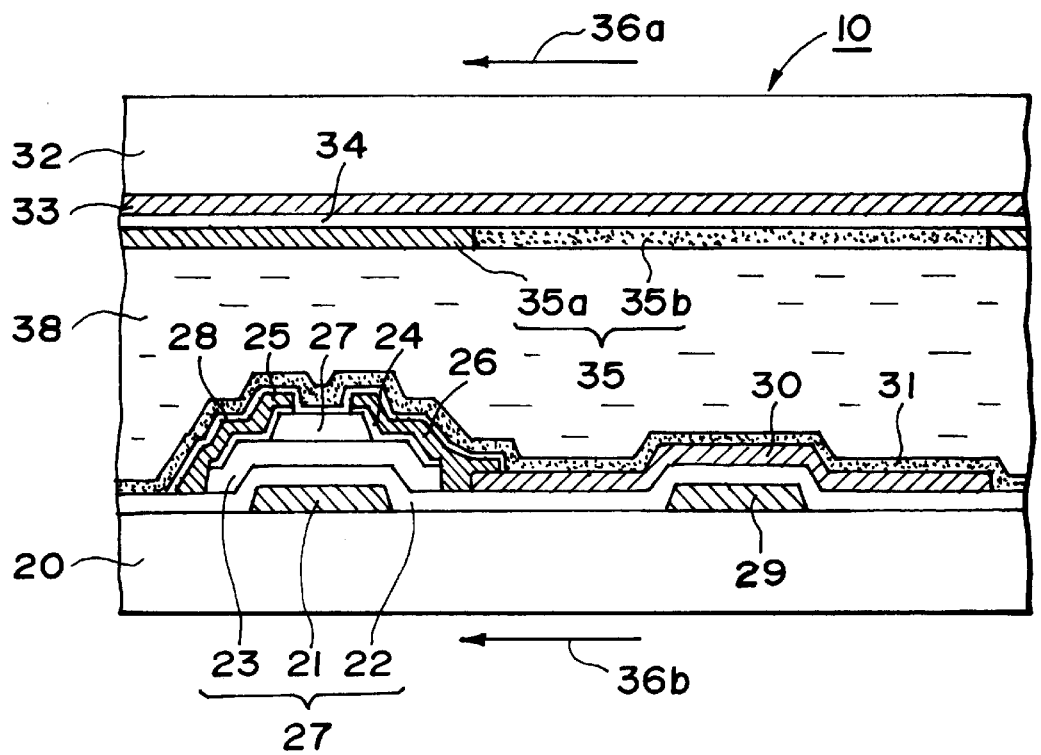
FIGS. 10 and 11 are respectively a schematic sectional view of a pixel in an embodiment of the liquid crystal device of the invention.
Figure 12:
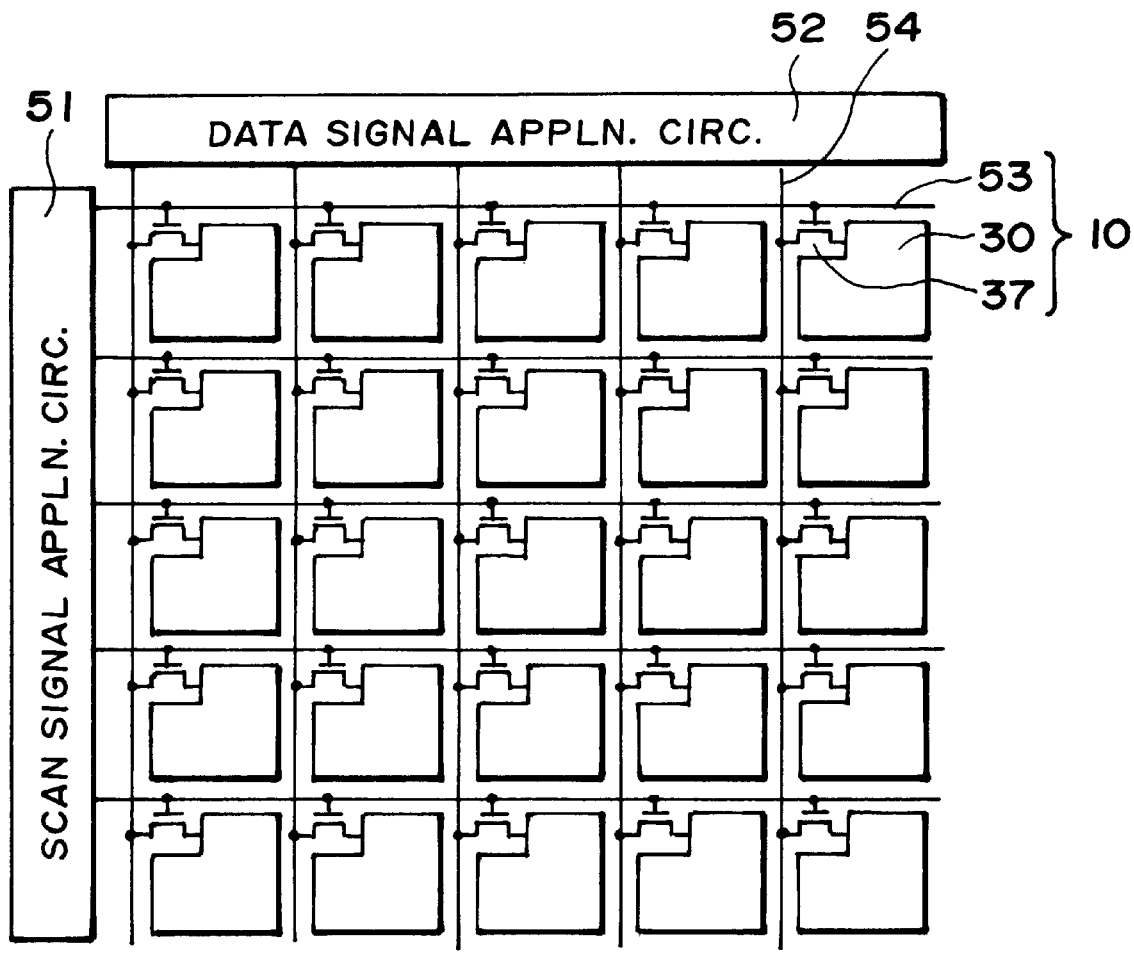
FIG. 12 is a schematic plan view of a display panel including a liquid crystal device according to the invention and peripheral drive circuits.

FIG. 10 shows a sectional view of one pixel of an embodiment of the liquid crystal device according to the present invention, and FIG. 12 is a schematic plan view of a display panel including the liquid crystal device. The liquid crystal device is an active matrix-type liquid crystal device 10 using TFTs (thin film transistors) as switching elements (devices). As shown in FIG. 12, the liquid crystal device 10 includes a plurality of pixel electrodes 30 arranged in the form of a matrix, and each pixel electrode 30 is provided with a TFT 37, of which a gate electrode is connected to a scanning signal line 53 and a source electrode is connected to a data signal line 54 so as to form a wiring matrix. The respective scanning signal lines 53 are sequentially supplied with a scanning selection signal (ON signal for TFTs 37 on a selected line) from a scanning signal application circuit 51, and in synchronism with the scanning selection signal, the respective data signal lines 54 are supplied with data signals carrying prescribed gradation data from a data signal application circuit 52 to supply the data signals to the pixel electrodes 30 on the selected line, thereby writing in the liquid crystal at the respective pixels to provide prescribed display states.

Referring to FIG. 10 for describing a sectional structure, each pixel of the liquid crystal device 10 comprises a substrate 20, a TFT 37 disposed on the substrate 20 and comprising a gate electrode 21, a gate insulating film 22, a semiconductor layer 23, an ohmic contact layer 24, an insulating layer 27, a source electrode 25, a drain electrode 26 and a passivation film 28, a pixel electrode 30 connected to the drain electrode 26, a retention capacitor electrode 29, a homogeneous alignment film 31 disposed over the above-mentioned members on the substrate 20, a counter substrate 32 having thereon a common electrode 33, an insulating layer 34 and a composite alignment film 35 including a homeotropic alignment film region 35a and a homogeneous alignment film region 35b, and a liquid crystal 38 disposed between the alignment films 31 and 35 which have been rubbed in directions 36b and 36a, respectively.

Referring to FIG. 10, in the case of a transmission-type liquid crystal device, the substrate 20 is a transparent one comprising ordinarily glass or plastic, and in the case of a reflection-type device the substrate 20 can be an opaque substrate comprising, e.g., silicon, in some cases. The pixel electrodes 30 and the common electrode 33 comprise a transparent conductor, such as ITO (indium tin oxide) in the case of a transmission type but the pixel electrodes 30 can comprise a metal having a high reflectivity so that also functions as a reflector in the case of a reflection type. The semiconductor layer 23 may generally comprise amorphous (a-)Si which may for example be formed in a thickness of ca. 200 nm on a glass substrate heated at ca. 300° C. by glow discharge decomposition (plasma CVD) of mono-silane ($SiH_4$) diluted with hydrogen. Alternatively, it is also possible to preferably use polycrystalline (p-)Si. The ohmic contact layer 25 may for example be formed by doping an $n^+$ a-Si layer with phosphorus. The gate insulating film 23 may comprise silicon nitride ($SiN_x$), etc., as formed by glow discharge decomposition. Further, the gate electrode 21, source electrode 25, drain electrode 26, retention capacitor electrode 29, and lead conductors, may generally comprise a metal, such as Al. As for the retention capacitor electrode 29, it can some times comprise a transparent conductor, such as ITO. The insulating layer 34 may comprise $Ta_2O_5$, etc., and the insulating layer 27 and the passivation layer 28 may preferably comprise an insulating film of, e.g., silicon nitride.

In order to realize a twist alignment state over the entire area as a holding state in this embodiment of liquid crystal device, the homeotropic alignment film region 35a may preferably be formed so as to surround the respective pixel electrodes 30, and the liquid crystal 38 may preferably be placed in hybrid alignment in the region. In this invention, it is preferred that such a hybrid alignment region is formed in a region not affecting the display. Accordingly, as adopted in the embodiment of FIG. 10, the hybrid alignment region may be formed at spacings between pixel electrodes and masked by a black matrix (not shown), so that the hybrid alignment region may be disposed outside the pixels formed at apertures of the black matrix. Incidentally, the homeotropic alignment film region 35a for providing the hybrid alignment region need not be formed on the common electrode-side substrate as shown in FIG. 10 but can be formed on the TFT-side substrate (20).

Figure 11:
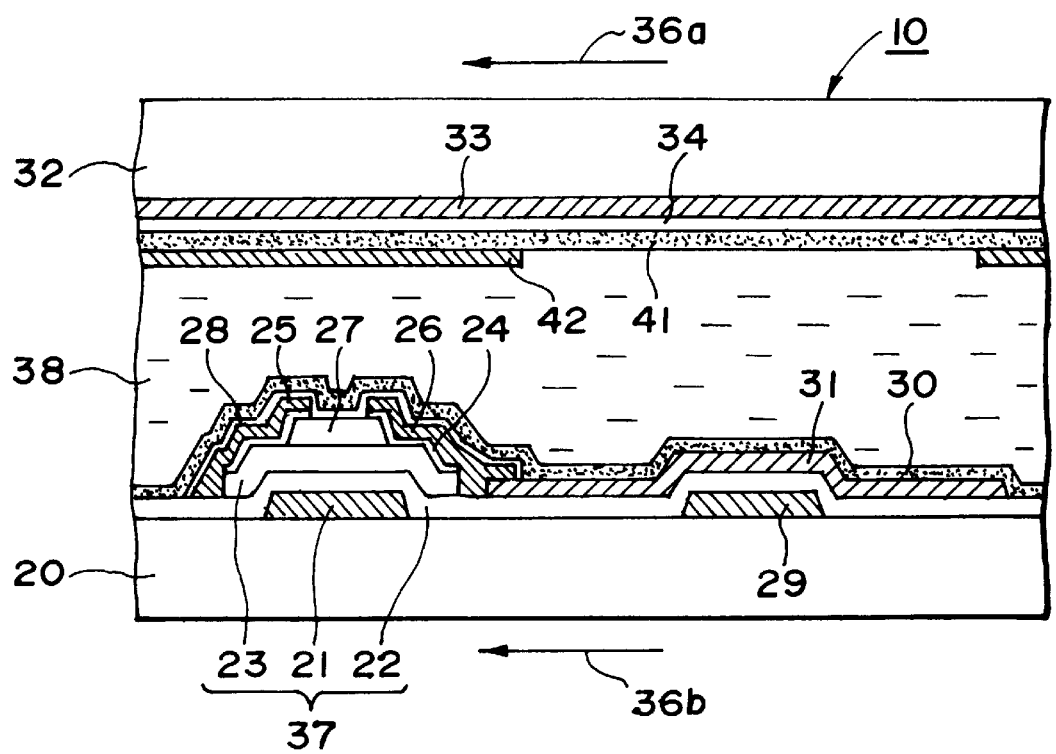

On the other hand, FIG. 11 shows an embodiment of liquid crystal device according to the present invention using a composite alignment film comprising a homogeneous alignment film 41 and a homeotropic alignment film 42 locally formed on the homogeneous alignment film 41 as produced through the process described with reference to FIGS. 15A–15D. In this embodiment, the homeotropic alignment film 42 is formed so as to extend to some extent into the region of the pixel electrodes 30, whereby the liquid crystal at the spacings between the pixel electrodes is prevented from being transformed into twist alignment to disturb the alignment at pixels even on attenuation of voltage applied to the pixel. Also in his embodiment, a black matrix (not shown) may be formed corresponding to the homeotropic alignment film 42, so that the hybrid alignment region disposed outside the pixels is masked.

Figure 17:
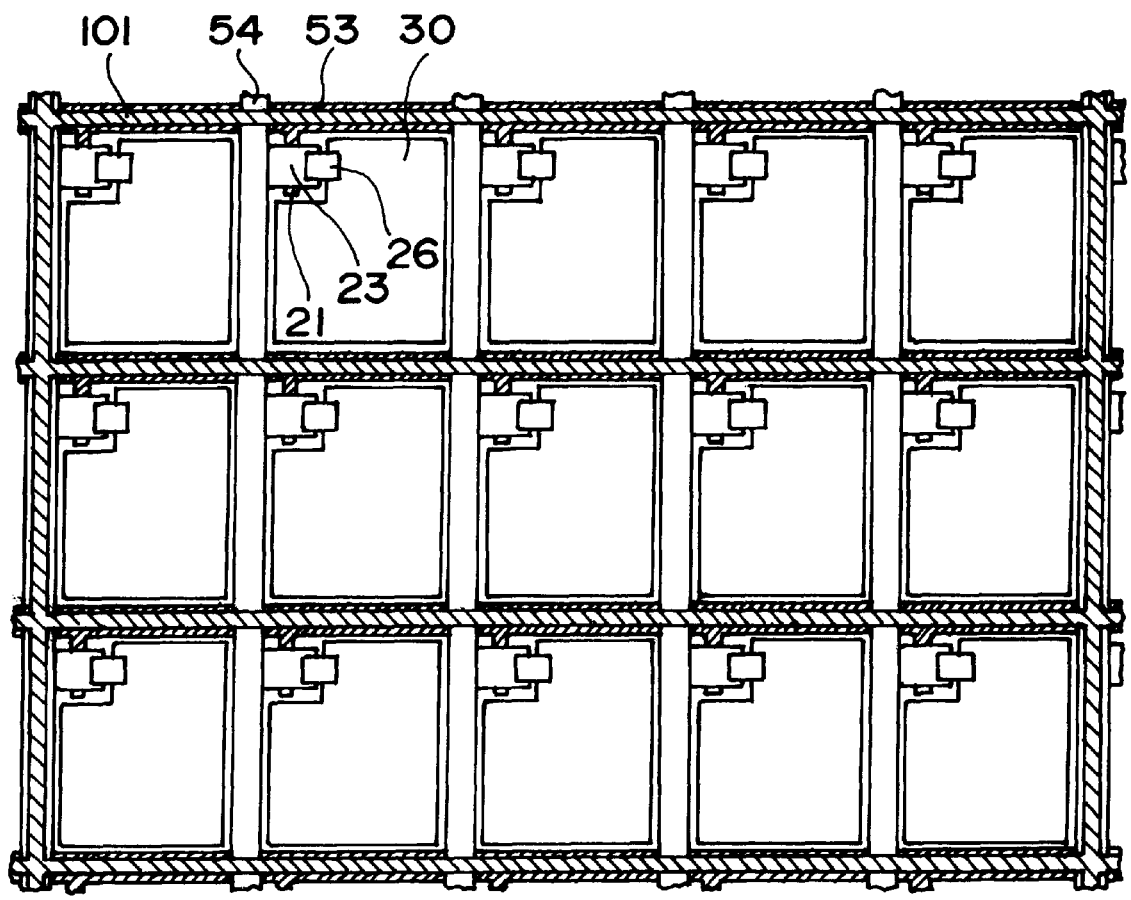
FIGS. 17 and 18 are respectively a plan view showing an example of arrangement of hybrid or homeotropic alignment regions in a liquid crystal device according to the invention.
Figure 18:
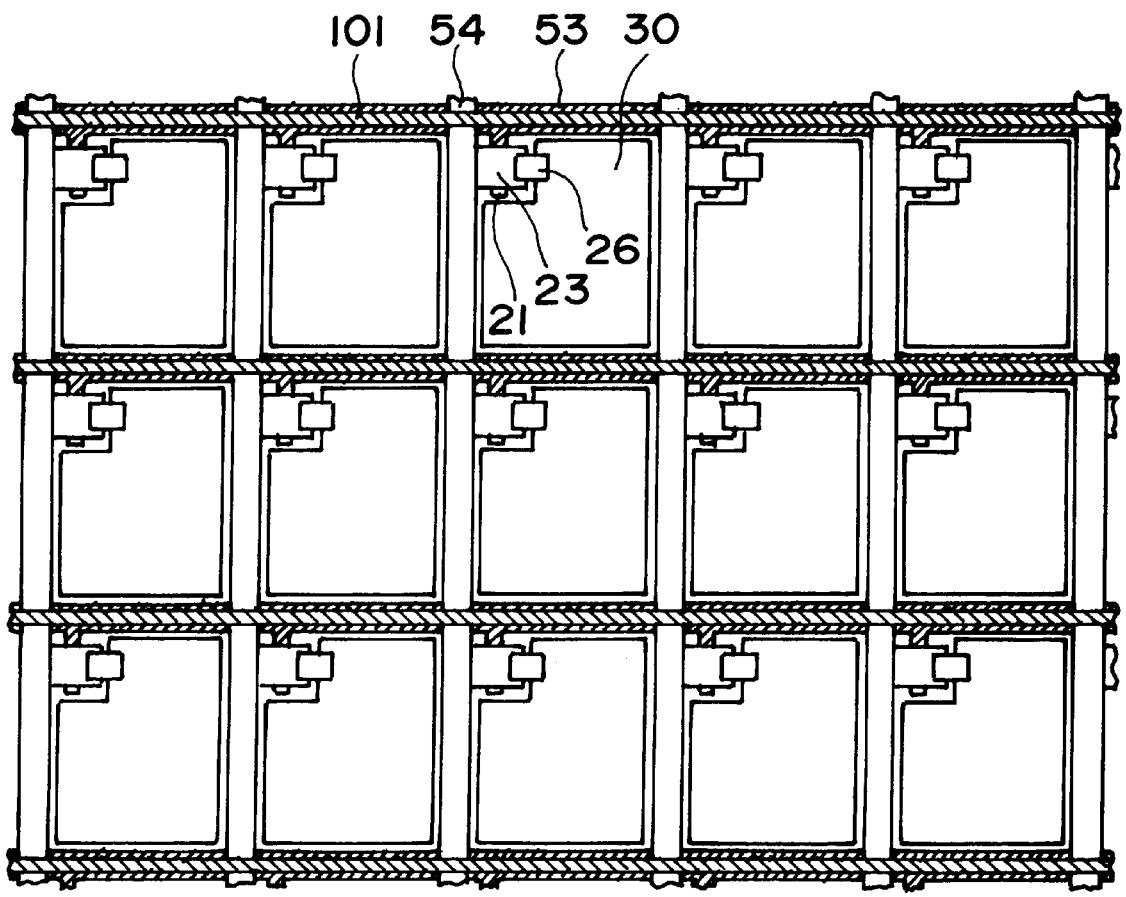

Such a hybrid or homeotropic alignment region as provided by the homeotropic alignment film region 35a (FIG. 10) or 42 (FIG. 11) may preferably be disposed at pixel spacing surrounding the respective pixels as shown in FIGS. 10 and 11, or as a frame-like region 101 formed on lead electrodes so as to surround a plurality of pixels as shown in FIG. 17 in order to stabilize the twist alignment state under no electric field at the pixels. However, the hybrid or homeotropic alignment region 101 may also be formed in the form of spots or stripes (FIG. 18) on the lead electrodes as far as the desired effect is attained. By disposing the hybrid or homeotropic region on the lead electrodes in this way, a voltage difference acting between the voltage applied to the lead electrodes and the voltage applied to the common electrode may be utilized to form the hybrid A alignment or homeotropic alignment state thereat.

Figure 16:
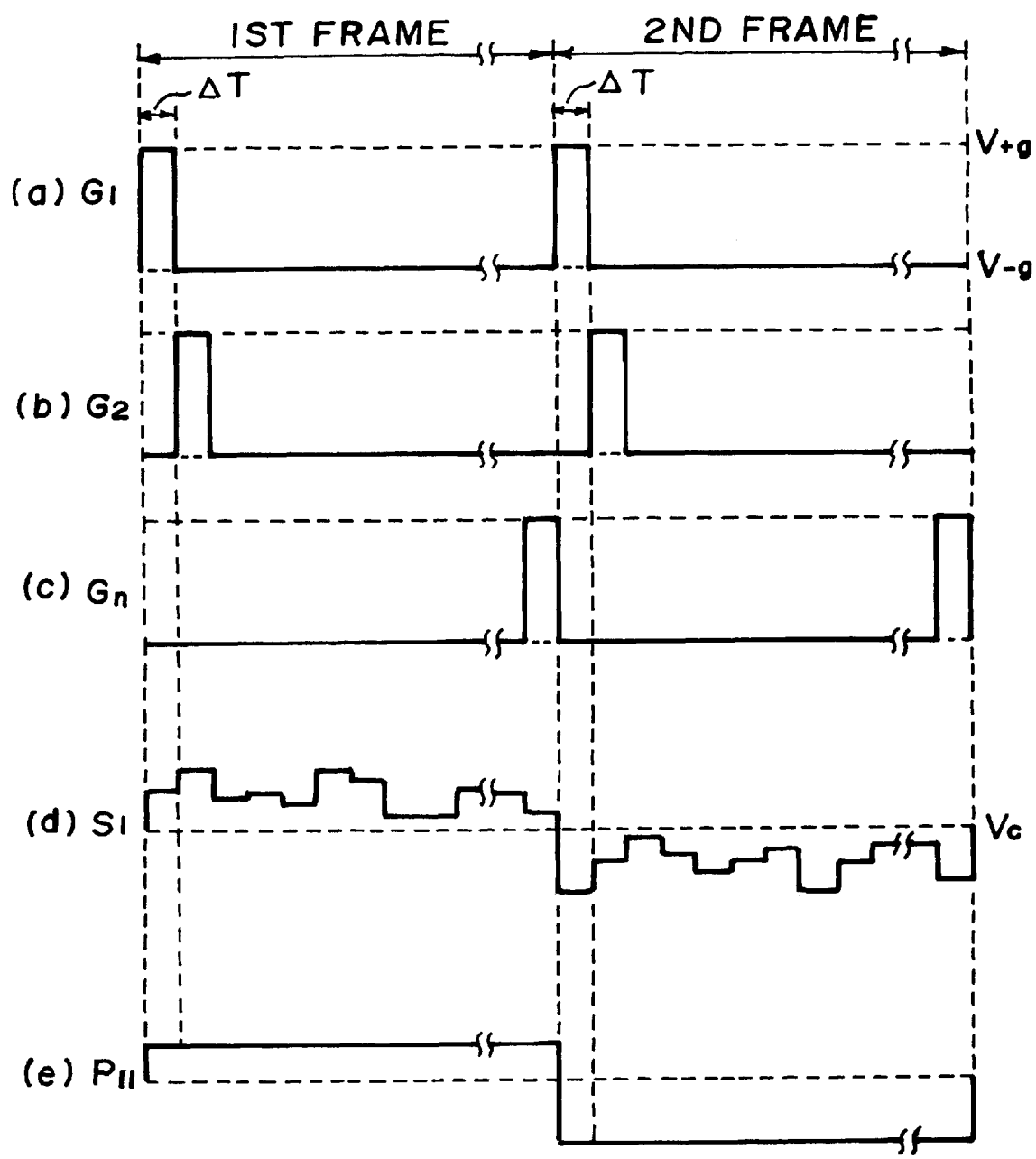
FIG. 16 is a waveform diagram for illustrating a set of drive voltage waveforms for driving a liquid crystal device according to the invention.

FIG. 16 shows an example set of drive signal waveforms for driving the above-mentioned embodiments.of liquid crystal devices shown in FIGS. 10 and 11. Referring to FIG. 16, at (a)–(c) are shown scanning signal waveforms applied to first, second and n-th (final) scanning signal lines, respectively. At (d) is shown a data signal waveform applied to a first data signal line, and at (e) is shown a voltage waveform applied to a pixel on a first row and a first column as a result of application of the scanning signal waveform at (a) and the data signal waveform at (d).

The liquid crystal device according to the present invention may also be driven in a bend alignment at a further improved response speed by applying a lower side voltage larger than the holding voltage.

Figure 13A:
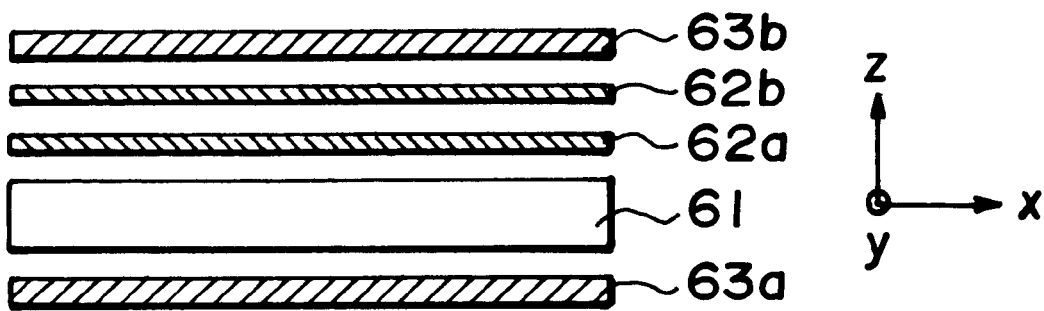
FIG. 13A is a stacked view of a liquid crystal device according to the invention and optical members, and FIG. 13B illustrate a relationship between a rubbing direction and polarization axes of the device.
Figure 13B:
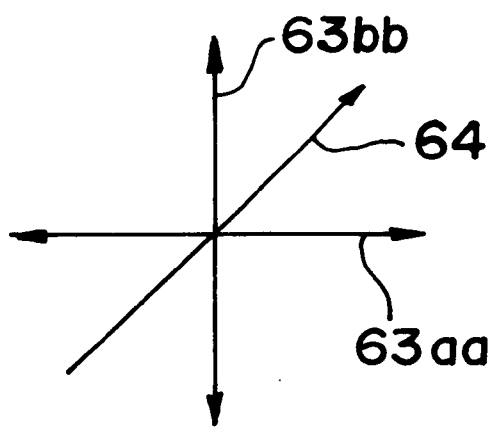

When a liquid crystal device 61 according to the present invention is used as a transmission device, as shown in FIG. 13A, a pair of polarizers 63a and 63b are disposed outside the liquid crystal device 61. In this instance, the polarization axes 63aa and 63bb of the polarizers 63a and 63b, respectively, are disposed as shown in FIG. 13B so as to form an angle of 45 deg. each from a rubbing direction 64 provided to the pair of substrates (which represents an average of rubbing direction when rubbing directions of the substrates intersect each other at some angle). In case where the liquid crystal device is used to form a reflection device, the polarizer 63a disposed on an opposite side as viewed from a viewer can be omitted.

In the liquid crystal device according to the present invention, it is preferred to dispose a uniaxial phase compensation plate 62a (formed by laminating a plurality of retardation films) having a positive retardation so as to compensate for a retardation of light passing through the liquid crystal layer at a prescribed voltage, thereby effecting an optical compensation of black display at that voltage. Further, as the liquid crystal molecules at a central portion of the liquid crystal layer are rich in components normal to the substrates and are liable to impair the viewing angle characteristic under voltage application, it is also preferred to insert a phase compensation plate 62b having a negative retardation (R<0) of relatively reducing the component of Z-direction, thereby reducing a retardation difference between a component perpendicular to and a component parallel to the substrates in the liquid crystal layer, thereby improving the viewing angle characteristic. Alternatively, instead of using the phase compensation plates 62a and 62b, it is also possible to use a biaxial phase compensation plate having the functions of these in combination.

The liquid crystal device according to the present invention may be produced by using a nematic liquid crystal and a specific composite alignment film so as to provide prescribed alignments as described above. With respect to other members, the materials, shape, size thereof and production process therefor need not be particularly restricted, but known techniques for liquid crystal device production may be applicable for production thereof.

EXAMPLES

Hereinbelow, the present invention will be described more specifically based on Examples.

Example 1

A liquid crystal device including a hybrid alignment region was prepared. The composite alignment film was prepared through a process as described with reference to FIGS. 14A–14D. Thus, referring to these figures, a glass substrate 32 was coated with a 150 nm-thick transparent electrode 33 of ITO of 1 cm×1 cm by vacuum deposition and then with 100 nm-thick insulating layer 34 of $Ta_2O_5$. Thereon, an alignment film material ("LQ1800" available from Hitachi Kasei K.K.) was applied by spin coating, followed by baking at 270° C. for 20 min. on a hot plate to form a 20 nm-thick alignment film 35a. Then, a photomask resist ("TPAR", available from Tokyo Ohka K.K.) was formed in a prescribed pattern 71, followed by rubbing and peeling of the resist 71. The rubbing intensity was adjusted to provide a pretilt angle of 10 deg. As a result, a first substrate having thereon a 1 cm×1 cm wide square electrode on which a homeotropic alignment film pattern 35a was formed longitudinally and laterally in a width of 10 pm and at a pitch of 200 μm so as to surround square homogeneous alignment regions 35b.

Separately, a second substrate having a 1 cm ×1 cm ITO electrode and an entirely homogeneous alignment film was prepared though identical steps as above except for omitting the formation of the resist.

The thus-prepared two substrates were disposed opposite to each other with their rubbing directions aligned in identical directions are applied to each other with 5 μm-dia. spacer beads disposed therebetween, followed by injection of a non-chiral nematic liquid crystal ("KN-5027", available from Chisso K.K.), to prepare a liquid crystal device.

The liquid crystal exhibited principal physical properties a follows.

Nematic→isotropic phase transition temperature: 80° C.

Δε (dielectric anisotropy): 7.9

Δn (refractive index anisotropy): 0.159

In the above liquid crystal device, the liquid crystal just after the injection was aligned in splay alignment over the entire area. In the device, nuclei of bend alignment could be generated in the splay alignment region by application of a voltage Vb=2.0 volts and then further placed in bend alignment over the entire area by increasing the voltage up to 4.4 volts. Then, the applied voltage was lowered to 0 volt, whereby the liquid crystal in the homogeneous alignment regions surrounded by the hybrid alignment region was changed into twist alignment.

Then, when the device was supplied with a voltage, the liquid crystal in twist alignment was changed to bend alignment at a voltage $V_{e1}$=0.7 volt.

For comparison, a comparative liquid crystal device was prepared in the same manner as above except for omitting the formation of the photoresist on the first substrate, and then subjected to similar application of voltages, whereby nuclei of bend alignment occurred at 2.5 volts, and bend alignment over the entire area was caused at a voltage of 5.8 volts. A holding voltage of 1.9 volts was necessary for retaining the bend alignment. Further, when the voltage was removed, the bend alignment was restored to the splay alignment. On the other hand, in the above-mentioned liquid crystal device of this example, a holding voltage $Ve_2$ for retaining the bend alignment was 0.7 volt identical to $Ve_1$, as the transformation between twist alignment and bend alignment was continuously effected. Accordingly, a re-bending treatment before use became substantially unnecessary, and the holding voltage could be remarkably reduced.

Example 2

A liquid crystal device having a sectional structure as shown in FIG. 10 was prepared by using a TFT substrate instead of the second substrate in Example 1 and drive characteristics after optical compensation were examined. A hybrid alignment film region 35a was formed so as to cover spacings between pixel electrodes 30. Each TFT 27 was provided with a semiconductor layer 23 of ca. 200 nm-thick a-Si formed by glow discharge decomposition. The retention capacitance 29 was set to ca. 9 pF.

Drive voltages of ±2.0 volts and ±5.2 volts were used, and the bending treatment was performed by alternately applying a rectangular signal of 5.3 volts and 60 Hz and zero volt.

The liquid crystal device was driven by a set of drive signal voltage waveforms shown in FIG. 16 set to $V_{+g}$=10 volts, $V_{-g}$=−10 volts, ΔT=16 μsec, data signal voltages of ±2.0 volts to ±5.3 volts for picture display, and a common electrode potential set to a reference potential. A retardation difference of 190 nm was caused between application of 2.0 volts and application of 5.3 volts, so that the optical compensation was performed by using a phase compensation plate 62a having a retardation of 320 nm as shown in FIG. 13A so as to display black at ±2.0 volts (normally black display). The response time was 0.5 msec from the state at a voltage of 2.0 volts to the state at a voltage of 5.3 volts, and the response time from 5.3 volts to 2.0 volts was 5.0 msec. According to the liquid crystal device of this example, it was possible to cause a switching between twist and bend alignments by application of 0 volt to 4.0 volts for display.

The liquid crystal device 61 of this example was placed as shown in FIGS. 13A and 13B between a pair of cross nicol polarizers 63a and 63b so that its rubbing axis 64 formed an angle of 45 deg. from the polarization axes 63aa and 63bb of the polarizers. Further, as mentioned above, a positive phase compensation plate 62a having a retardation of 320 nm was inserted for optical compensation at black display in the normally black display; and further a phase compensation plate 63b having a negative retardation was disposed so as to improve the viewing angle characteristic. More specifically, the phase compensation plate 62b was set so as to provide an index ellipsoid giving a refractive index $n_z'$ in a direction normal to the substrate and refractive index $n_x'$ perpendicular to the $n_z'$ direction (with a refractive index $n_y'$ (=$n_x'$) in the direction perpendicular to both the $n_z'$ and $n_x'$ directions) satisfying $n_z'$=$n_x$ and $n_x'$=$n_z$ with respect to light having passed through the liquid crystal device and the phase compensation plate 62a and exhibiting an index ellipsoid including a refractive index $n_z$ in a direction normal to the substrates and a refractive index $n_x$ in a direction perpendicular to the $n_z$ direction (with a refractive index $n_y$ (=$n_x$) in the direction perpendicular to both the $n_x$ and $n_z$ directions).

Example 3

A liquid crystal device having a structure identical to that of Example 2 was prepared except for changing the alignment film material and the liquid crystal material. The composite alignment film on the first substrate was prepared through a process as illustrated in FIGS. 15A–15D. More specifically, an ITO film 33 on a first substrate 32 was further coated with an insulating layer 34 of 100 nm-thick $Ta_2O_5$ formed by vacuum deposition and then with an alignment film material ("AL-0656", available from Nippon Gosei Gomu K.K.) by spin coating, followed by baking at 200° C. for 30 nm, to form a 50 nm-thick alignment film 41. Then, a photoresist ("OFPR 800" available from Tokyo Ohka K.K.) was formed in a pattern 71 for protecting a desired homogeneous alignment film region, and then contacted with a solution in a mixture solvent of water and IPA (isopropyl alcohol) of surface treating agent ("FC-805" available from 3M Co.) for providing a homeotropic alignment film region 42, followed by baking at 110° C.(FIG. 15B). Then, the resist 71 was removed by peeling (FIG. 15C), and the remaining alignment films 41 and 42 were rubbed by a rubbing roller so as to provide a pretilt angle of 7 deg. at the homogeneous alignment film regions 41.

On the other hand, the second TFT substrate was provided with only the rubbed homogeneous alignment film (of "AL0656").

A liquid crystal device was prepared by using the above-prepared the substrates together with a non-chiral nematic liquid crystal ("KN-5030", available from Chisso K.K.) showing the following physical properties otherwise in the same manner as in Example 2.

Nematic→isotropic phase transition temperature: 80° C.
$\Delta \epsilon$ (dielectric anisotropy): 10.4
$\Delta n$ (refractive index anisotropy): 0.130

Drive voltages of ±2.0 volts and ±6.0 volts were used, and the bending treatment was performed by alternately applying a rectangular signal of 6.0 volts and 60 Hz and zero volt.

The liquid crystal device was driven by a set of drive signal voltage waveforms shown in FIG. 16 set to $V_{+g}$=10 volts, $V_{-g}$=–10 volts, $\Delta T$=16 μsec, data signal voltages of ±2.0 volts to ±6.0 volts for picture display, and a common electrode potential set to a reference potential. A retardation difference of 150 nm was caused between application of 2.0 volts and application of 6.0 volts, so that the optical compensation was performed by using a phase compensation plate 62a having a retardation of 250 nm as shown in FIG. 13A so as to display black at ±2.0 volts (normally black display). The response time was 1.0 msec from the state at a voltage of 2.0 volts to the state at a voltage of 6.0 volts, and the response time from 6.0 volts to 200 volts was 10 msec. According to the liquid crystal device of this example, it was possible to cause a switching between twist and bend alignments by application of 0 volt to 4.0 volts for display.

Similarly as the one of Example 2, the liquid crystal device of this example provided a stable twist alignment by a single electric field treatment, and the bend alignment state was retained at a holding voltage of 0.8 volt. The transformation from twist alignment to bend alignment was possible at 2.0 volts, and the bend aligning treatment before re-use was substantially unnecessary.

Example 4

A liquid crystal device was prepared as follows. A first substrate was provided with 3×4 pixel electrodes as shown in FIG. 8, which were connected with signal electrodes so as to allow independent voltage supply to the respective pixels. A second substrate was provided with a common electrode on the entire area. Homogeneous alignment film regions were formed at the pixel electrodes and a homeotropic alignment film regions was formed at the spacing 4 between the pixel electrodes, i.e., so as to surround the homogeneous alignment film regions, by a process similar to the one used in Example 1 including the use of identical alignment film material and treatment and also liquid crystal material.

The liquid crystal device was sandwiched between a pair of cross nicol polarizers. In the initial state, all the pixels were in the dark because of splay alignment. Then, the liquid crystal device was supplied with AC voltages of ±5 volts to form bend alignment, and then the AC voltages were removed, whereby the respective pixels retained twist alignment to provide a bright state. The liquid crystal device was then left standing under no electric field for several days, whereby the respective pixels retained the alignment state as represented by the bright state, so that a display memory characteristic under no electric field was confirmed, thus exhibiting an applicability to a display requiring only a small power consumption.

As described above, according to the present invention, in a liquid crystal device for display utilizing a bend alignment, it becomes possible to remarkably reduce the bending voltage before re-use and the holding voltage, thereby realizing the use of lower drive voltages and economical power consumption.

Particularly, by surrounding appropriately prescribed region(s) (pixel region(s)) with a hybrid or homeotropic alignment region, it becomes possible to stably retain twist alignment, thereby substantially unnecessitating re-bending treatment and simultaneously reducing the voltage for holding the bend alignment.

What is claimed is:

1. A liquid crystal device, comprising: a pair of substrates each having thereon an electrode and an alignment film, and a layer of nematic liquid crystal disposed between the substrates, wherein
    at least one alignment film includes a homeotropic alignment film region capable of aligning longer axes of liquid crystal molecules in contact therewith to form an angle of 80–90 deg. with respect to the associated substrate surface, and another alignment film region capable of placing the liquid crystal in contact therewith in splay alignment for the liquid crystal in an as-injected state and in an alignment state capable of conversion into a bend alignment on application of a prescribed voltage for the liquid crystal in an operational state, and
    said bend alignment is an alignment state of liquid crystal molecules across a thickness thereof between the substrates wherein the longer axes of the liquid crystal molecules are gradually rotated in one direction from one substrate to the other substrate so as to be vertical at an intermediate position between the substrates.

2. A liquid crystal device according to claim 1, wherein the liquid crystal in a region in contact with the homeotropic alignment film region is in an alignment state capable of continuous transformation into twist alignment.

3. A liquid crystal device according to claim 2, wherein the liquid crystal except for the region in contact with the homeotropic alignment film region is entirely aligned in twist alignment.

4. A liquid crystal device according to claim 2, wherein the liquid crystal except for the region in contact with the homeotropic alignment film region is partially aligned in splay alignment.

5. A liquid crystal device according to claim 1, wherein said homeotropic alignment film region is formed so as to surround said another alignment film region.

6. A liquid crystal device according to claim 1, wherein said another alignment film region is homogeneous alignment film region.

7. A liquid crystal device according to claim 6, wherein the liquid crystal in a region in contact with the homeotropic alignment film region is aligned in a hybrid alignment state.

8. A liquid crystal device according to claim 6, wherein the liquid crystal in a region in contact with the homeotropic alignment film region is aligned in a homeotropic alignment state.

9. A liquid crystal device according to claim 6, wherein said pair of substrates have thereon oppositely disposed homogeneous alignment film regions which have mutually parallel alignment directions.

10. A liquid crystal device according to claim 6, wherein said pair of substrates have thereon oppositely disposed homogeneous alignment film regions which have mutually parallel and identical alignment directions.

11. A liquid crystal device according to claim 1, wherein said homeotropic alignment film region is formed at least outside a region of pixel.

12. A liquid crystal device according to claim 1, wherein said liquid crystal is free from a chiral component.

* * * * *

UNITED STATES PATENT AND TRADEMARK OFFICE
CERTIFICATE OF CORRECTION

PATENT NO. : 6,542,211 B1
DATED : April 1, 2003
INVENTOR(S) : Shinjiro Okada et al.

It is certified that error appears in the above-identified patent and that said Letters Patent is hereby corrected as shown below:

<u>Title page,</u>
Item [57], ABSTRACT,
Line 7, "twit" should read -- twist --.

<u>Column 3,</u>
Line 30, "realined" should read -- realigned --; and
Line 37, "out" should read -- our --.

<u>Column 7,</u>
Line 57, "realined" should read -- realigned --.

<u>Column 12,</u>
Line 13, "embodiments." should read -- embodiments --.

<u>Column 13,</u>
Line 24, "of 10 pm" should read -- of 10µm --; and
Line 38, "a" should read -- as --.

<u>Column 15,</u>
Line 20, "the" should be deleted; and
Line 63, "regions" should read -- region --.

Signed and Sealed this

Sixteenth Day of March, 2004

JON W. DUDAS
*Acting Director of the United States Patent and Trademark Office*